Nov. 22, 1949 L. SOHN 2,488,681
CHILD'S WHEELED CHAIR

Filed Feb. 5, 1946 2 Sheets-Sheet 1

LEE SOHN
INVENTOR.

BY *J. B. Feelsin*

ATTORNEY.

Nov. 22, 1949          L. SOHN          2,488,681

CHILD'S WHEELED CHAIR

Filed Feb. 5, 1946          2 Sheets-Sheet 2

LEE SOHN
INVENTOR.

BY

ATTORNEY.

Patented Nov. 22, 1949

2,488,681

UNITED STATES PATENT OFFICE 2,488,681

CHILD'S WHEELED CHAIR

Lee Sohn, Sunnyside, N. Y.

Application February 5, 1946, Serial No. 645,618

5 Claims. (Cl. 155—1)

This invention relates to wheeled vehicles and more particularly to perambulators or strollers adapted to carry infants or small children.

One of the objects of this invention is to combine with such a wheeled vehicle means for transporting packages, clothing or similar articles so as to relieve the operator of the burden of carrying them separately.

Another object of this invention is to produce a wheeled vehicle of this character in which the frame not only serves as the principal support of the child, but further serves to provide compartments or chambers which are convenient to the operator, but out of the reach of the occupant.

Still a further object of this invention is to provide a combination child's carriage and transporting cart which is of extremely simple construction so as to permit considerable economies in the manufacture thereof, and which further functions as an efficient support for a child in both sitting and reclining positions.

Other objects of my invention will be apparent from the following description, it being understood that the above general statements of the objects of my invention are intended to describe and not to limit it in any manner.

Referring to the drawings.

Figure 1:
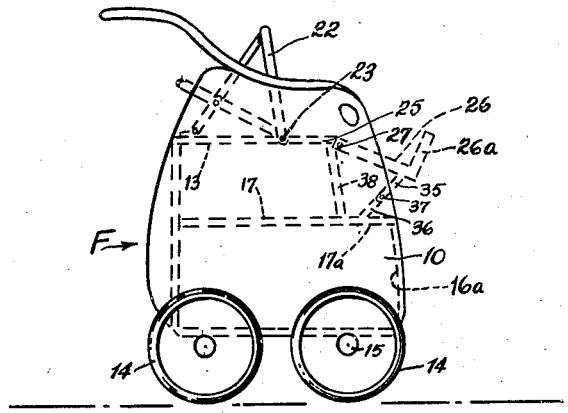
Fig. 1 is a side view in elevation of a wheeled vehicle embodying the present invention, the central structure thereof being shown in broken lines.
Figure 2:
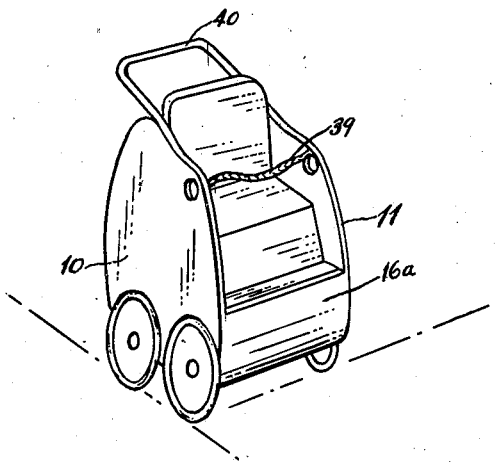
Fig. 2 is a front perspective view thereof, the body rest portion being shown in a sitting position.
Figure 3:
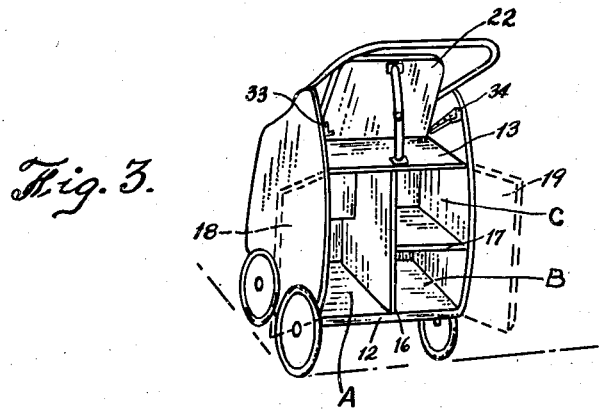
Fig. 3 is a rear perspective view of the vehicle and showing the open compartment doors in dark lines.
Figure 4:
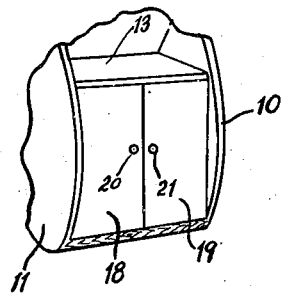
Fig. 4 is a fragmentary view illustrating the compartment section with the doors thereof closed.

The supporting structure or frame work F of the vehicle comprises side walls 10 and 11 which are preferably constructed of plywood or wood, but which may be of metal, if desired, or of any other suitable material. A floor or bottom wall 12 and roof 13 cooperate with the sides 10 and 11 in forming a compartment section.

Wheels 14 are rotatably mounted on axles 15 which may be secured to the floor 12 by any conventional means. Wheels 14 may be of the ordinary disc type although, if desired, rubber tires may be provided to absorb the shocks of riding which might otherwise be transmitted to the occupant or to articles transported by the vehicle. The compartment section is provided with a vertical partition 16 and a horizontal partition 17 which divide the section into suitable compartments or chambers A, B and C. The frame F further comprises a front wall 16a which extends from floor 12 up to the level of partition 17. Said partition is extended forward to meet the upper end of front wall 16a as at 17a. Extending upwardly from extension 17a to roof 13 is a wall 38 set back from front wall 16a. Partition 16 extends to walls 38, 17a and 16a and is parallel to side walls 10, 11. Compartment A extends from floor 12 to walls 17a and 13 and may receive taller articles. Compartment B is below horizontal partition 17 and is deeper than compartment C which is above said partition. Compartment B extends to front wall 16a whereas Compartment C extends to wall 38 only. Doors 18 and 19 are pivotally mounted to side wall 10 and 11 as by conventional hinges so as to form enclosures for the rear of the compartment section and to permit the selective exposure of the compartments. Knobs 20 and 21 serve as gripping members for operating the doors.

The body rest member is formed in three sections, the back rest section 22 being hingedly mounted on the roof 13 at horizontal pivot 23 on the hinge ears 24. The ears 24 are set back from wall 38 and the forward part of roof 13 forms a seat or central section 25 for the occupant of the vehicle. Central section 25 comprises a front portion of roof 13, while leg rest section 26 is pivotally mounted at the front edge of the roof 13, a pivot pin 27 serving to connect leg rest section 26 thereto. Leg rest 26 is provided with a forwardly extending foot rest 26a at its lower end adapted to overlie wall 17a.

Figure 5:
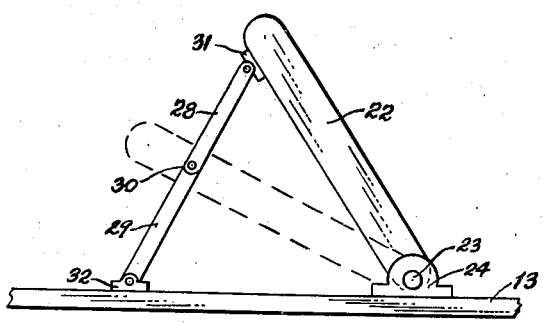
Fig. 5 is an enlarged fragmentary view illustrating the back rest section, and showing the back rest in lowered position in dark lines.

Means are provided to enable the child occupant to either sit up or recline according to the will of the operator. For this purpose, links 28 and 29 are pivotally connected to each other at 30 and to brackets 31 and 32 respectively. Bracket 31 is secured to back rest section 22, and bracket 32 is secured to roof 13. Referring to Fig. 5, it will be understood that when brackets 28 and 29 are mutually collapsed, back rest 22 will become lowered so as to permit the occupant of the body rest to recline. Inclined brackets 33 and 34 attached to the inner surfaces of side walls 11 and 10 respectively, serve as stop means for limiting the downward movement of back rest section 22.

Leg rest section 26 is provided with an operating mechanism similar to that of back rest 22. Thus, link sections 35 and 36 are pivotally connected to each other at 37 so that when back rest section 22 is adjusted to a reclining position, the leg rest section may be elevated, so that the three sections of the body rest are in substantial alignment to permit the occupant to assume a reclining or sleeping position. When leg rest section 26 is in the downward position, no stop means are required therefor since the adjacent wall 38 of the compartment section serves as a limit therefor.

In order to prevent the child occupant from falling out of the vehicle, a cord or strap 39 may be provided and secured in any manner to the side walls of the structure. Propelling means are provided in the form of a handhold member 40 which is preferably of metal or similar material and secured in any suitable manner to the side walls 10 and 11.

It will be appreciated from the foregoing that a vehicle for transporting a child has been provided which permits the assumption of either a sitting or reclining state. The supporting means for this body rest member further serves as compartments permitting the transportation of articles together with the child occupant. Such articles are maintained out of the reach of the occupant, it being notable that such an occupant is most apt to discard or otherwise damage any movable article available to him. The doors 18 and 19 serve as a further precaution against such an event. The structure is furthermore of extreme simplicity both in design and construction, the side walls 10 and 11 not only serving to define or partially enclose the compartment sections, but further serving as enclosing or protecting members to prevent the child occupant from falling out of the vehicle.

I have shown a preferred embodiment of my invention, but it is obvious that numerous changes and omissions may be made therefrom without departing from its spirit.

I claim:

1. A child's vehicle comprising a pair of parallel side walls, a bottom wall, a front wall extending upwardly between said side walls, a horizontal wall extending rearwardly from the upper end of the front wall, a wall extending upwardly from said rearwardly extending wall, a top wall extending rearwardly from the upper end of said upwardly extending wall, and a back rest extending upwardly from said top wall and being set back from said upwardly extending wall, said back rest being hinged to said top wall, and means to support said back rest in a plurality of angular positions, and a leg rest hinged to the forward end of said top wall and adapted to be swung against the front surface of said upwardly extending wall.

2. A child's vehicle comprising a pair of parallel side walls, a bottom wall, a front wall extending upwardly between said side walls, a horizontal wall extending rearwardly from the upper end of the front wall, a wall extending upwardly from said rearwardly extending wall, a top wall extending rearwardly from the upper end of said upwardly extending wall, and a back rest extending upwardly from said top wall and being set back from said upwardly extending wall, said back rest being hinged to said top wall, and means to support said back rest in a plurality of angular positions, and a leg rest hinged to the forward end of said top wall and adapted to be swung against the front surface of said upwardly extending wall, and means to support said leg rest in a position where it is swung away from said upwardly extending wall.

3. A child's vehicle comprising a pair of parallel side walls, a bottom wall, a front wall extending upwardly between said side walls, a horizontal wall extending rearwardly from the upper end of the front wall, a wall extending upwardly from said rearwardly extending wall, a top wall extending rearwardly from the upper end of said upwardly extending wall, and a back rest extending upwardly from said top wall and being set back from said upwardly extending wall, a vertical partition disposed parallel to the side walls, and extending from the bottom wall to the top wall, and contacting the inner surfaces of the front wall and upwardly extending wall and the underside of said rearwardly extending wall.

4. A child's vehicle comprising a pair of parallel side walls, a bottom wall, a front wall extending upwardly between said side walls, a horizontal wall extending rearwardly from the upper end of the front wall, a wall extending upwardly from said rearwardly extending wall, a top wall extending rearwardly from the upper end of said upwardly extending wall, and a back rest extending upwardly from said top wall and being set back from said upwardly extending wall, a vertical partition disposed parallel to the side walls, and extending from the bottom wall to the top wall, and contacting the inner surfaces of the front wall and upwardly extending wall and the underside of said rearwardly extending wall, and a horizontal partition interconnecting one side wall and said vertical partition, and being substantially at the level of said rearwardly extending wall.

5. A child's vehicle comprising a pair of parallel side walls, a bottom wall, a front wall extending upwardly between said side walls, a horizontal wall extending rearwardly from the upper end of the front wall, a wall extending upwardly from said rearwardly extending wall, a top wall extending rearwardly from the upper end of said upwardly extending wall, and a back rest extending upwardly from said top wall and being set back from said upwardly extending wall, a vertical partition disposed parallel to the side walls, and extending from the bottom wall to the top wall, and contacting the inner surfaces of the front wall and upwardly extending wall and the underside of said rearwardly extending wall, and a horizontal partition interconnecting one side wall and said vertical partition, and being substantially at the level of said rearwardly extending wall, and doors hinged to the side walls and adapted to close the compartments formed by said partitions and walls.

LEE SOHN.

REFERENCES CITED

The following references are of record in the file of this patent:

UNITED STATES PATENTS

| Number | Name | Date |
| --- | --- | --- |
| D. 93,759 | Breaux, Jr. | Nov. 6, 1934 |
| 119,523 | Krieger | Oct. 3, 1871 |
| 162,578 | Rowell | Apr. 27, 1875 |
| 879,803 | Vlasak | Feb. 18, 1908 |
| 1,302,343 | Farrer | Apr. 29, 1919 |
| 1,714,115 | Voetter | May 21, 1929 |
| 1,832,642 | Leff | Nov. 17, 1931 |
| 1,926,796 | Stransky | Sept. 12, 1933 |
| 2,050,492 | Lassiter | Aug. 11, 1936 |
| 2,055,890 | Berry | Sept. 29, 1936 |

FOREIGN PATENTS

| Number | Country | Date |
| --- | --- | --- |
| 199,930 | Switzerland | Sept. 15, 1938 |
| 511,608 | Great Britain | Aug. 22, 1939 |